F. FOWLER.
Tricycle.
No. 224,165. Patented Feb. 3, 1880.
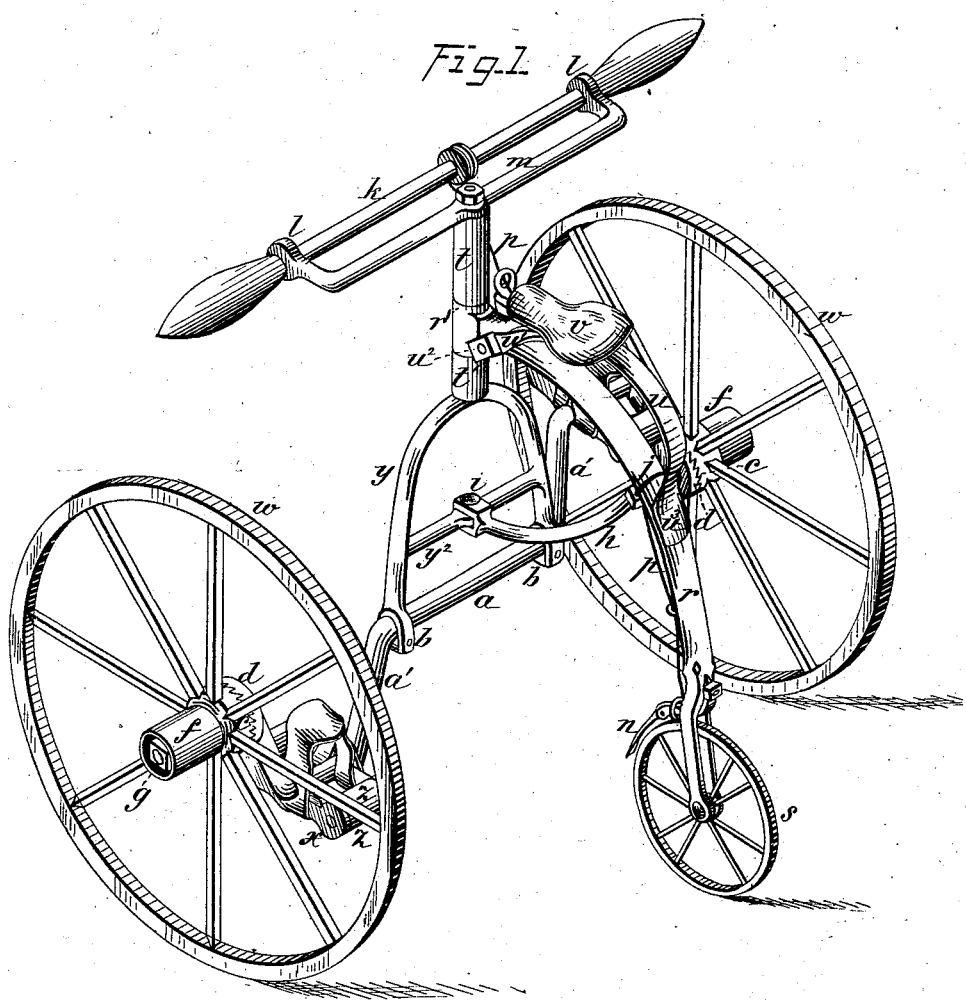
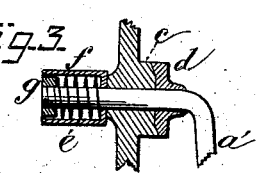
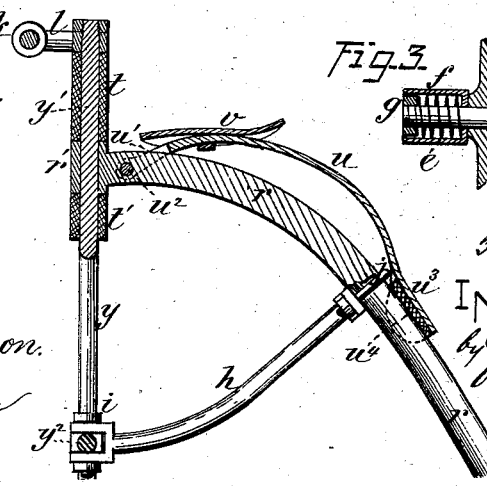
Witnesses:
Jas. E. Hutchinson.
Floyd Norris.
Francis Fowler
INVENTOR
by Johnson & Johnson
Attys.

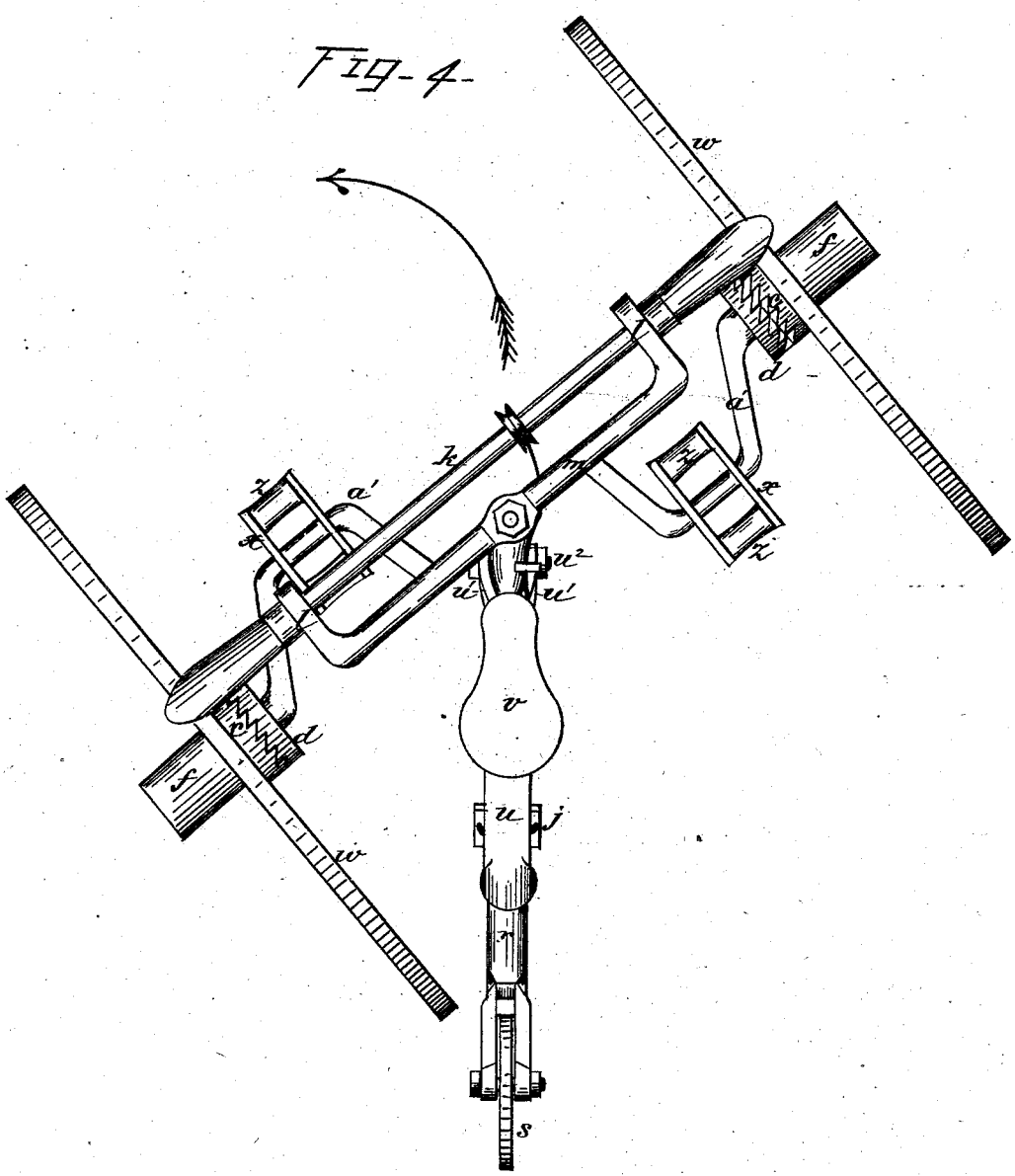

UNITED STATES PATENT OFFICE.

FRANCIS FOWLER, OF NEW HAVEN, CONNECTICUT.

TRICYCLE.

SPECIFICATION forming part of Letters Patent No. 224,165, dated February 3, 1880.

Application filed December 23, 1879.

*To all whom it may concern:*

Be it known that I, FRANCIS FOWLER, of New Haven, in the county of New Haven and State of Connecticut, have invented certain new and useful Improvements in Tricycles, of which the following is a specification.

My object in improving the velocipede is to obtain the advantages of the bicycle and the tricycle combined. With this view I use three wheels for greater safety to the rider, and I employ the large front wheels both as the driving and as the steering wheels, with a downward-sloping reach, having only a small supporting-wheel, and connect said sloping reach with a yoke-frame mounted upon the axle between the crank-axles and within the traction and steering wheels.

By this construction I am enabled to connect the curved part of the reach to the vertical central yoke-frame at a point low down and near the crank-axle by means of a curved or upwardly-inclined brace pivoted to the yoke-frame below its upper tubular connection with the reach, and extending beneath said reach and firmly strapped thereto in a manner to transfer the concussions and strain upon the reach to a point of the yoke-frame near the crank-axle, and thereby not only prevent the breaking of the reach by sudden concussions upon the rear supporting-wheel, from any cause, but lessening the liability of the reach being thrown over with the rider, as is frequently the case in two-wheeled velocipedes.

I make the driving-wheels also the means of steering by mounting the wheels loose upon their axles and providing their hubs and the axle with interlocking ratchet-disks adapted to drive the wheels forward by the action of the cranks, and to allow the outer wheel to slip in turning, while the inner wheel maintains its ratchet-connection, thus allowing the tricycle to make a short turn while under high speed and without danger of capsizing. I also provide means for overcoming or neutralizing the concussions and jarring of the several points of support for the rider, so as to render him as free as possible from the injurious effects of jarring and sudden concussions, and thus render the travel more agreeable.

Referring to the accompanying drawings, Figure 1 represents a view, in perspective, of a tricycle embracing my invention; Fig. 2, a partial vertical section, showing the cushioned bearings for the seat; Fig. 3, a section of the ratchet crank-shaft connection with the front driving and steering wheels; and Fig. 4, a top view, showing the driving-wheels as making a short turn.

In my improved tricycle I use two large front driving or traction wheels, $w\ w$, fitted loosely upon the crank-axle $a$, and which form the guiding or steering wheels, in connection with a small rear supporting-wheel, $s$, for the curved metal reach $r$, which is connected to a central supporting metallic frame mounted upon said axle between the cranks $a'\ a'$, to which the foot-rests or pedals are secured. This central supporting-frame has a yoke form, $y$, the lower ends of which are secured to the middle part, $a$, of the axle by suitable boxes $b\ b$, and the top terminates in a center part, $y'$, to which the reach is secured by a tubular termination, $r'$, in the usual manner of two-wheeled velocipedes, and within which tubular connection the yoke-frame turns to steer the front wheels, and from which point the reach curves rearward and downward, being forked at its lower end to receive the bearings of the small supporting-wheel.

The crank-shaft is operated in the usual manner, by the action of the rider upon the crank-treadles, and the traction-wheels are driven forward by ratchet-connections by the turning of said shaft. These ratchet-connections are formed by ratchet-disks $c$, secured upon the inner ends of the wheel-hubs, and similar ratchet-disks $d$, fixed to the axle, so that the teeth interlock to drive the wheels forward, and are maintained in such locked relation by means of springs $e$, placed upon the axle-bearings, so as to exert an inward force against the outer ends of the hubs. For this purpose these springs are inclosed within tubular boxes $f$, open at their outer ends and closed at their inner ends to form bearings against the outer ends of the hubs, the boxes being held to such action by nuts $g$ on the outer ends of the axles, so that the wheels are not only firmly supported upon their axle-bearings, but the boxes $f$ cover and protect the springs from dirt thrown off by the wheels. This ratchet-connection is for the purpose of allowing the tricycle to turn short while in motion, by reason of the outer wheel slipping over the axle ratchet-disk, while the inner wheel, turning the short curve, maintains its ratchet-connection.

This construction gives important advantages in a velocipede of three wheels, and especially one in which the large front wheels not only constitute the drivers but the steering-wheels, and in which the rear small wheel serves merely as a support for the reach. I use a reach having a downward-sloping curve, similar to that used in a bicycle having a small rear supporting-wheel and a single front traction and steering wheel; but under my improved construction, with the central reach-supporting and steering frame arranged between the traction and steering wheels, I am enabled to brace the reach at its curved connection with said frame, and thereby prevent the danger of snapping the reach in the event of the small rear supporting-wheel entering a rut or striking an obstruction, as has frequently been the case in bicycles when under high speed. For this purpose the brace $h$ is beneath the tubular connected end of the reach, and extends from a point near the axle, where it is pivoted to a cross-bar, $y^2$, of the central reach-supporting frame by a vertical bolt, $i$, passing through the divided end of said brace, and from which it extends in a curve or upward incline to a point below the greatest curve of the reach, on the under side of which it bears and is secured by an embracing-strap, $j$, thus transferring the strain and shocks from sudden concussions of the rear supporting-wheel from a point above the top of the front wheels to a point near the axle, giving absolute security to the reach against being broken and very materially lessening the liability of the reach being suddenly thrown over to the front with the rider, yet retaining the rider's seat in position nearly over the crank-axle to give the desired traction to the driving-wheels.

Under this construction, the rear supporting-wheel is free to rise and fall in passing over mounds or obstructions, and the front wheels may be turned quite short in relation to the rear wheel.

The tiller or steering bar $k$ is fitted in eyed arms $l$ of a cross-bar, $m$, rigidly secured upon the upper end of the central part, $y'$, of the yoke-frame, by which to steer the front traction-wheels through the yoke-frame. The tiller-bar $k$ serves also to control a brake, $n$, pivoted to the reach, so as to be caused to bear upon the front side of the rear supporting-wheel, by means of a cord, $p$, connected with said tiller-bar $k$, so that the rider, by turning the latter in its bearings, will wind and release the cord.

To counteract the vertical concussions and vibrations of the yoke-frame upon the reach the tubular termination $r'$ of the latter is placed between springs $t\ t'$ on the central top-yoke part, $y'$, so as to overcome the jar upon the seat.

The under spring, $t'$, rests upon the top of the yoke, and the upper spring, $t$, is held down upon the reach-connection by the cross-bar $m$ of the tiller. The seat $v$ is secured to a bent spring-plate, $u$, provided with arms $u'$, which embrace the reach just back of its tubular termination $r'$, and is secured by a screw-bolt, $u^2$, passing horizontally through said arms and the reach, while the rear end of said spring-plate termintes in a saddle-formation, $u^3$, resting free upon the back of the reach, just below its connection with the brace $h$, so that said saddle part is free to rise from sudden concussions upon the reach, and thus relieve the rider. The spring-plate $u$ is sufficiently stout to maintain a semi-elliptical form and have a slight sliding movement of its saddle-formed end $u^3$ upon the reach. This saddle part of the seat-spring is also cushioned with rubber $u^4$, to lessen the effect of the jarring and concussions upon the rider as much as possible, so as to render the exercise agreeable and free from undue vibrations.

By this construction the reach is cushioned at its connected end and the seat-spring pivoted thereon is cushioned at its free end, while the crank-pedals or foot-rests $x$ for the rider are provided with rubber rests $z$, giving heel and toe supports, thus isolating the rider at every point of support from the injurious and uncomfortable effects of jar and concussion. The crank-pedals $x$ are provided with instep-straps, whereby the rider may exert an upward as well as a downward force on the cranks; but these pulling-straps may be dispensed with, so as to leave the feet unhampered in case of an accidental throwing forward of the reach and its supporting-frame. These foot-pedals are balanced upon the cranks, and secured by bearing-plates on the arms, between which the rubber rests are secured by through-pins.

I am aware that in four-wheel velocipedes the front wheels form the steering and driving wheels, and that said wheels are fixed upon a double-crank shaft with a yoke steering-frame, and that front wheels of velocipedes have also been fitted to turn loosely upon a straight axle, in which the rear wheels are made the drivers, and that a tricycle has been used in which the rear small wheel is made the guiding-wheel, and one of the front wheels is loose and the other is fixed upon the crank-shaft and forms the driver; but in none of these are the front traction and steering wheels provided with ratchet-connections which form the driving parts, while allowing short turns, in connection with a rear small supporting-wheel for the reach. Braces have been used in various ways to connect the reach with a yoke steering-frame, both in two-wheeled and in three-wheeled velocipedes, but not in the manner and in the combination in which I employ such brace. So, also, have ratchets and spring-pawls been used in connection with front driving-wheels, and in which a rear small wheel forms the guiding-wheel. Spring-ratchets have also been used in connection with rear driving-wheels, and in which the front wheels form the guiding-wheels; but the employment of ratchets in the manner and in the combination which I claim gives important advantages in my tricycle.

Seats have been mounted upon springs in various ways, and in which such springs have been connected with and rested with their free ends upon the reach; but such connection does not give the advantages of the way in which I connect such seat-spring in connection with a rubber-cushion bearing for its free end upon the reach. Nor do I claim springs placed upon the yoke guiding-frame above and below the reach-connection therewith, as this is not new.

In the organization of my tricycle certain new combinations are formed, and these, in connection with features of construction, constitute the invention, which I shall specifically present in my claims.

I claim—

1. The combination, in a tricycle, of the front traction and steering wheels, $w\ w$, loose upon their axle, and having ratchet-disk connections $d\ c$ with the crank-axle $a$, with a rear reach-supporting wheel, $s$, and the steering-yoke frame $y$, mounted upon said crank-axle between the traction-wheels, substantially as herein set forth.

2. The combination, in a tricycle, with the front traction and steering wheels, $w\ w$, loose upon their axle, and having ratchet-disk connections with the crank-axle $a$, the reach-supporting wheel $s$, and the steering-yoke frame $y$, of the brace $h$, pivoted to said yoke-frame at a point near the axle and rigidly connected to the reach below the point of its greatest bend, substantially as and for the purpose herein set forth.

3. The combination, in a tricycle, with the traction and steering wheels loose upon their axle, and provided with hub ratchet-disks $c\ c$, of the axle ratchet-disks $d$, the springs $e$, and the boxes $f$, inclosing said springs and maintaining a constant bearing upon the outer end of the hubs, substantially as and for the purpose herein set forth.

4. The combination, with the reach $r$, of the seat $v$, spring plate-support $u$, pivoted to the reach at one end and terminating in a saddle-bearing, $u^3$, at the lower end, which embraces and rests freely upon the reach, substantially as and for the purpose herein set forth.

5. In a tricycle having front traction and steering wheels and a rear reach-supporting wheel, constructed substantially as herein set forth, the spring-cushions $t\ t'$, above and below the reach-connection, with its yoke steering-frame, the foot-pedals with heel and toe rubber rests $z\ z$, and a cushioned bearing, $u^4$, at the saddle termination $u^3$, of the spring seat-support, all constructed and combined for use as herein set forth.

6. The combination, with the reach $r$, of the seat $v$, its spring plate-support $u$, pivoted to the reach at one end, and the cushioned rubber bearing at the saddle termination $u^3$ of the free end of the spring seat-support, substantially as and for the purpose herein set forth.

In testimony whereof I have hereunto set my hand.

FRANCIS FOWLER.

Witnesses:
JOHN A. WOOD,
GEO. A. ISBELL.